(12) United States Patent
Saraiva et al.

(10) Patent No.: US 12,547,741 B2
(45) Date of Patent: Feb. 10, 2026

(54) DYNAMICALLY MIGRATING DRIVE LOCKING KEYS ACROSS KEY MANAGEMENT SERVERS

(71) Applicant: DELL PRODUCTS L.P., Round Rock, TX (US)

(72) Inventors: Marcelo Saraiva, Austin, TX (US); Manjunath Vishwanath, Bangalore (IN); Ajay Shenoy, Bangalore (IN); Srikanth Krishnamurthy, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 119 days.

(21) Appl. No.: 18/639,433

(22) Filed: Apr. 18, 2024

(65) Prior Publication Data
US 2025/0328657 A1    Oct. 23, 2025

(51) Int. Cl.
*G06F 21/60* (2013.01)
*G06F 21/78* (2013.01)

(52) U.S. Cl.
CPC ............ *G06F 21/602* (2013.01); *G06F 21/78* (2013.01)

(58) Field of Classification Search
CPC .............................. G06F 21/602; G06F 21/78
See application file for complete search history.

(56) References Cited

U.S. PATENT DOCUMENTS

| | | | |
|---|---|---|---|
| 8,924,720 B2 | 12/2014 | Raghuram et al. | |
| 10,798,073 B2 | 10/2020 | Jahid et al. | |
| 2010/0031061 A1* | 2/2010 | Watanabe | G06F 21/80 713/193 |
| 2022/0191019 A1* | 6/2022 | Jaquette | H04L 9/0822 |

* cited by examiner

*Primary Examiner* — Sangseok Park
(74) *Attorney, Agent, or Firm* — Larson Newman, LLP

(57) ABSTRACT

An information handling system includes a BMC configurable in a first mode to provide external encryption keys for transactions with a storage device from external key management services, and in a second mode to generate local encryption keys for the transactions. At a first time, the BMC is configured in the first mode to provide external encryption keys for the transactions from a first external key management service. At a second time subsequent to the first time, the BMC is configured in the second mode to generate local encryption keys for the transactions. At a third time subsequent to the second time, the BMC is configured in the first mode to provide second external encryption keys for the transactions from a second external key management service. After the third time, no user data is lost on the first storage device as compared with a time prior to the first time.

20 Claims, 5 Drawing Sheets

DYNAMICALLY MIGRATING DRIVE LOCKING KEYS ACROSS KEY MANAGEMENT SERVERS

FIELD OF THE DISCLOSURE

This disclosure generally relates to information handling systems, and more particularly relates to dynamically migrating drive locking keys across key management servers in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a BMC configurable in a first mode to provide external encryption keys for transactions with a storage device from external key management services, and in a second mode to generate local encryption keys for the transactions. At a first time, the BMC may be configured in the first mode to provide external encryption keys for the transactions from a first external key management service. At a second time subsequent to the first time, the BMC may be configured in the second mode to generate local encryption keys for the transactions. At a third time subsequent to the second time, the BMC may be configured in the first mode to provide second external encryption keys for the transactions from a second external key management service. After the third time, no user data may be lost on the first storage device compared with a time prior to the first time.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
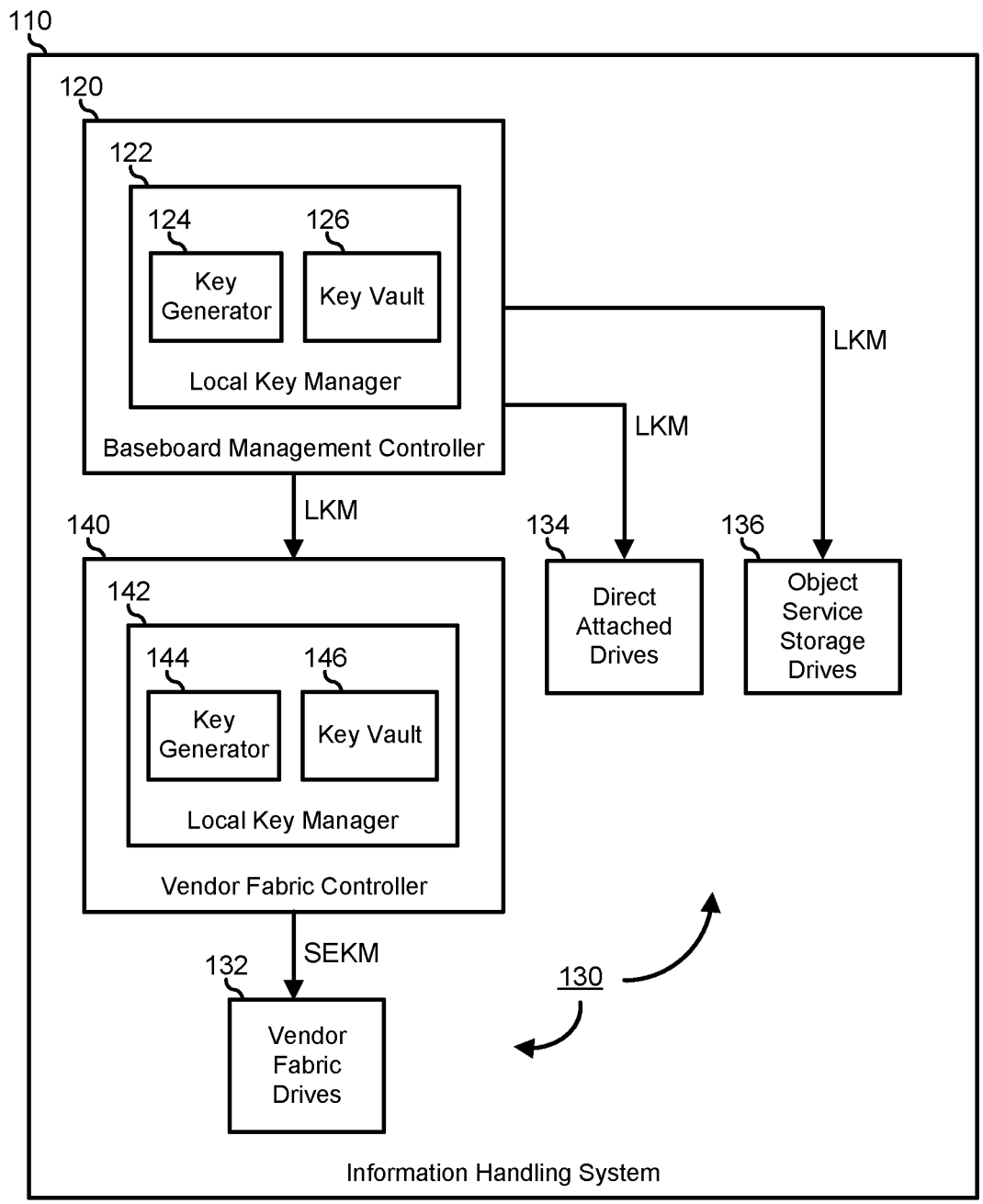
FIG. 1 is a block diagram illustrating an information handling system showing a method for encrypting secure data storage devices according to an embodiment of the present disclosure.

FIG. 1 illustrates a secure processing environment 100 including an information handling system 110. Information handling system 110 includes a baseboard management controller (BMC) 120 and various secure data storage drives 130. BMC 120 represents one or more processing devices and associated hardware that operate together to provide an out-of-band (OOB) management environment for information handling system 110. Secure data storage drives 130 represent self-encrypting drives (SEDs) that operate to receive data and to encrypt the data before storing the data to the associated storage media. Secure data storage drives 130 include vendor fabric drives 132, direct attached drives 134, and object storage service (OSS) drives 136. Vendor fabric drives 132 represent secure data storage drives that are provided by a particular manufacturer, such as the manufacturer of information handling system 110, that along with an associated vendor fabric controller 140, provide various value-add features as implemented in a proprietary fabric or as implemented by extensions to an existing fabric. An example of a vendor fabric controller 140 may include a PowerEdge RAID Controller (PERC) compatible data storage device, as provided by Dell, or another type of secure data storage drive provided in accordance with another manufacturer fabric, as needed or desired, and vendor fabric drives 132 may be data storage drives associated with the vendor fabric controller. Direct attached drives 134 represent secure data storage drives that are provided in accordance with various standard drive types or form factors, as needed or desired. An example of a direct attached drive may include a USB drive, a Fibre Channel drive, an Enterprise and Data Center Small Form Factor (EDSFF) drive, or the like. OSS drives 136 represent secure data storage that is instantiated within a cloud that is connected to information handling system 110, or the like.

Information handling system 110 operates to provide an additional security layer to secure data storage drives 130, over and above the SED functionality of the secure data storage drives. In particular, BMC 120 operates to provide for the encryption of the data transactions with secure data storage drives 130. That is in addition to the encryption of the stored data provided by the SED functionality, the data transactions are encrypted with security keys provided by BMC 120. As such, BMC 120 includes a local key manager (LKM) 122 with a key generator 124 and a key vault 126. LKM 122 operates to manage local security keys (LKM keys) for secure data storage drives 130, from key creation to key replacement and destruction. In particular, key generator 124 operates to generate the LKM keys that are utilized to encrypt the data transactions on secure data storage drives 130. Key vault 126 represents a secure data storage capacity associated with BMC 120 to securely store LKM keys.

Key vault 126 may include a trusted platform module (TPM), a lifecycle management module, or another secure data storage capacity, as needed or desired. Thus LKM 122 operates to manage the LKM keys for secure data storage drives 130 from key creation to key replacement and destruction. In this case, vendor fabric controller 140 provides a secure external key management (SEKM) feature that permits the vendor fabric controller to receive the LKM keys from LKM 122, and to pass the LKM keys to vendor fabric drives 132. The keys passed from vendor fabric controller 140 to vendor fabric drives 132 are illustrated as SEKM keys to indicate that the vendor fabric controller is operating in the SEKM mode. Direct attach drives 134 and OSS drives 136 receive their respective LKM keys directly from BMC 120. Thus in this case, BMC 120 operates in the LKM mode while vendor fabric controller 140 operates in the pass-through (SEKM) mode.

Figure 2:
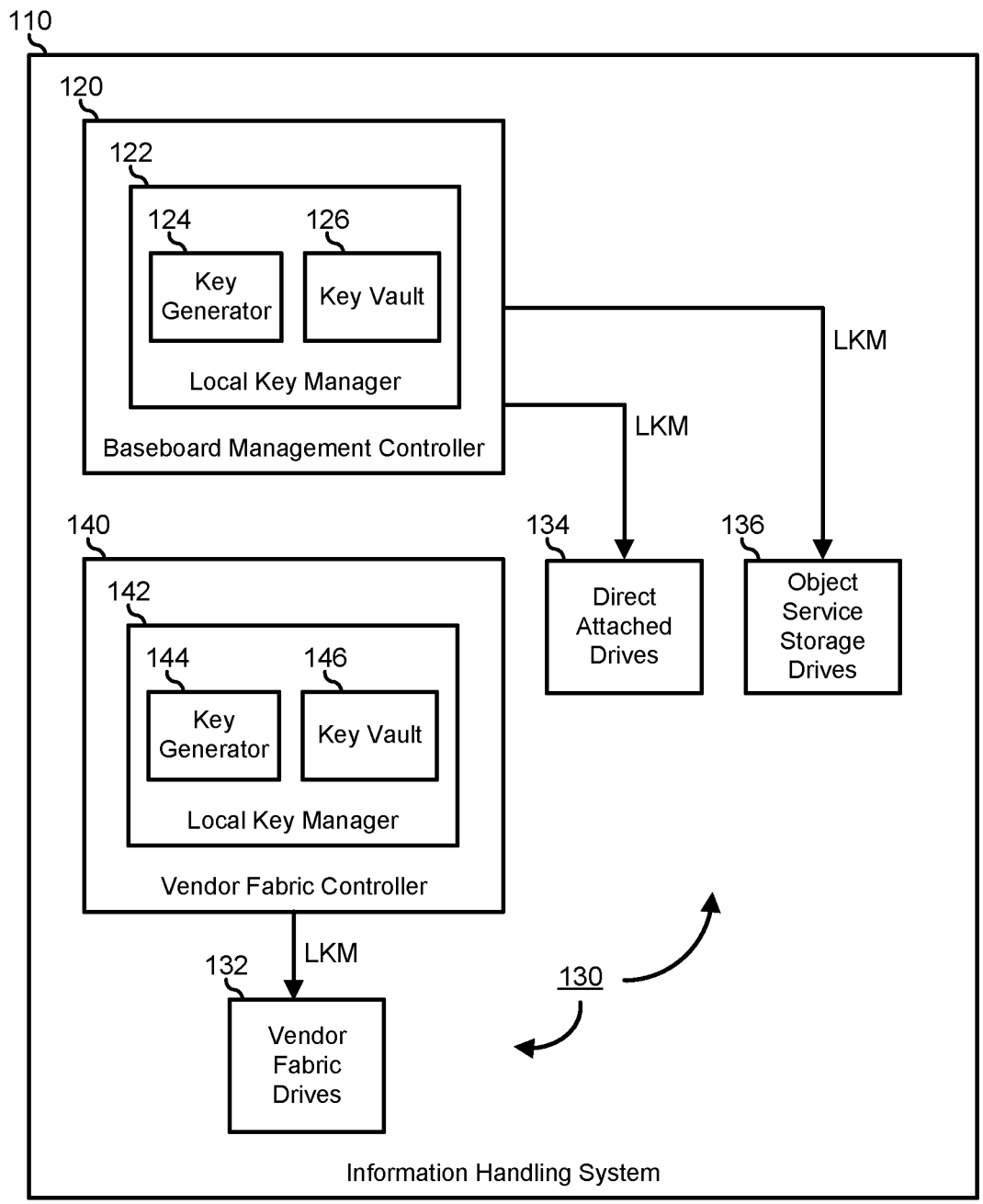
FIG. 2 illustrates the information handling system of FIG. 1 showing another method for encrypting secure data storage devices according to an embodiment of the present disclosure.

FIG. 2 illustrates another case for information handling system 110 where the additional security layer is provided for the user data on secure data storage drives 130 as described above. Here, in addition to the LKM function of BMC 120, vendor fabric controller 140 also provides a LKM function, and includes a LKM 142 with a key generator 144 and a key vault 146. LKM 142 is similar to LKM 122 and operates to manage LKM keys for secure data storage drives 130, from key creation to key replacement and destruction. In particular, key generator 144 is similar to key generator 122 and operates to generate the LKM keys that are utilized to encrypt the data transactions on vendor fabric drives 132. Key vault 146 is similar to key vault 126 and represents a secure data storage capacity associated with vendor fabric controller 140 to securely store LKM keys. In this case, LKM 122 operates to manage the LKM keys for direct attach drives 134 and for OSS drives 136, while LKM 142 operates to manage the LKM keys for vendor fabric drives 132.

Figure 3:
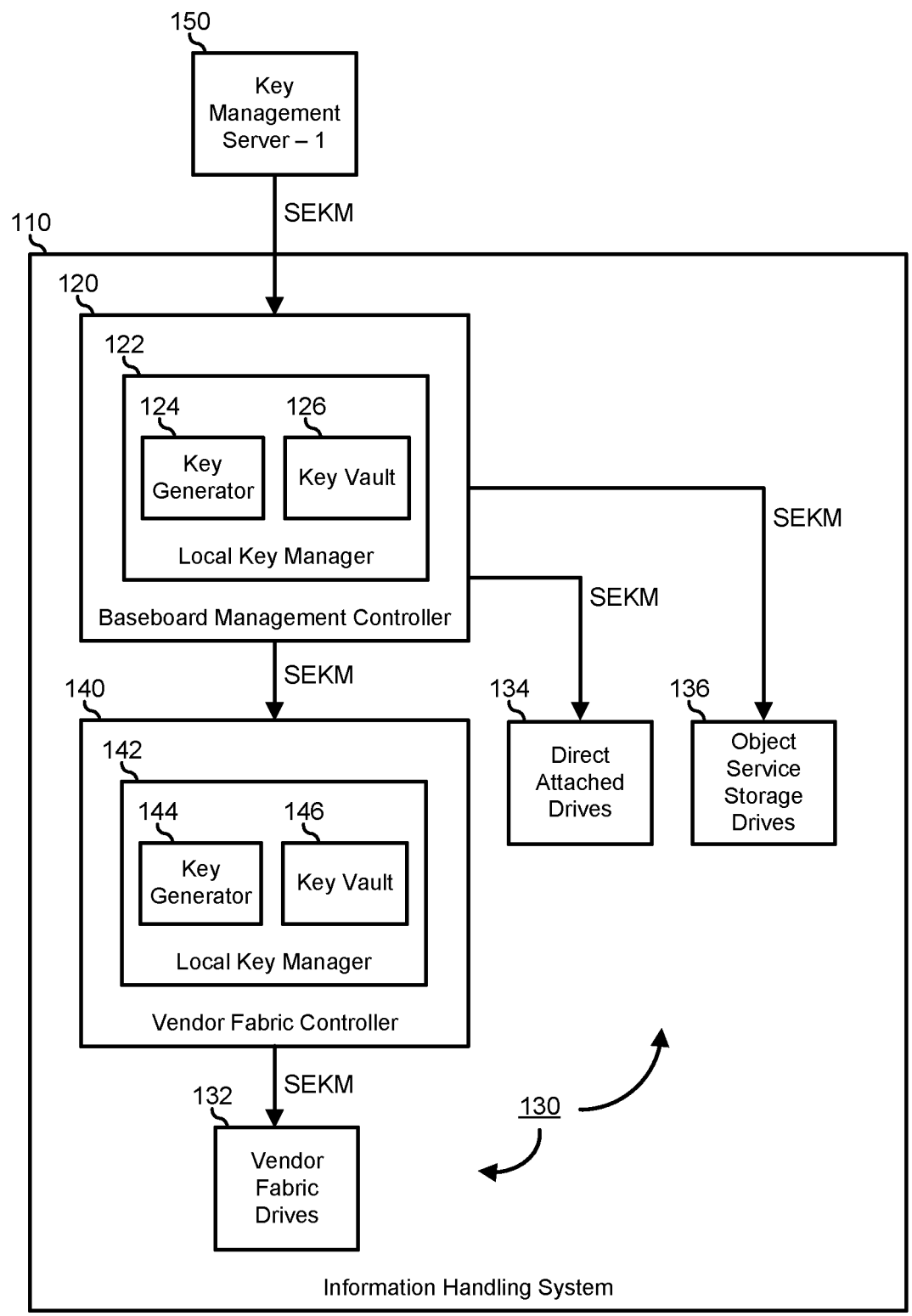
FIG. 3 illustrates the information handling system of FIG. 1 showing another method for encrypting secure data storage devices according to an embodiment of the present disclosure.

In FIG. 3, secure processing environment 100 is expanded to include a key management server 150 that is external to information handling system 110. Here, BMC 120 and vendor fabric controller 140 each provide the SEKM feature that provides the additional layer of security for the user data on secure data storage drives 130 based upon SEKM keys provided by KMS 150. In particular, when the SEKM feature is enabled, BMC 120 obtains SEKM keys for each of secure data storage drives 130 from KMS 150. KMS 150 operates to manage the SEKM keys for secure data storage drives 130 from key creation to key replacement and destruction. KMS 150 is typically provided by one or more outside vendor that provides security management as a service to the operator of information handling system 110. In this case, BMC 120 and vendor fabric controller 140 each enable the SEKM feature to receive SEKM keys for secure data storage drives 130. In particular vendor fabric drives 132 receive the SEKM keys from KMS 150 via BMC 120, while direct attach drives 134 and OSS drives 136 receive their respective SEKM keys directly from the BMC. Thus in this case, both BMC 120 and vendor fabric controller 140 operate in a pass-through mode to pass the SEKM keys from KMS 150 to secure data storage drives 130.

The utilization of external KMS services may provide the operator of information handling systems particular advantages over the use of internal security key management. For example, an external KMS service may provide stronger encryption or expanded features for enhanced security than may typically be available on an individual information handling system. Further, where an operator of multiple information handling systems, such as a data center operator or the like, may desire to monitor, manage, and maintain the security systems for all of the information handling systems via access to a single KMS service, rather than by monitoring, managing, and maintaining each information handling system individually.

Figure 4:
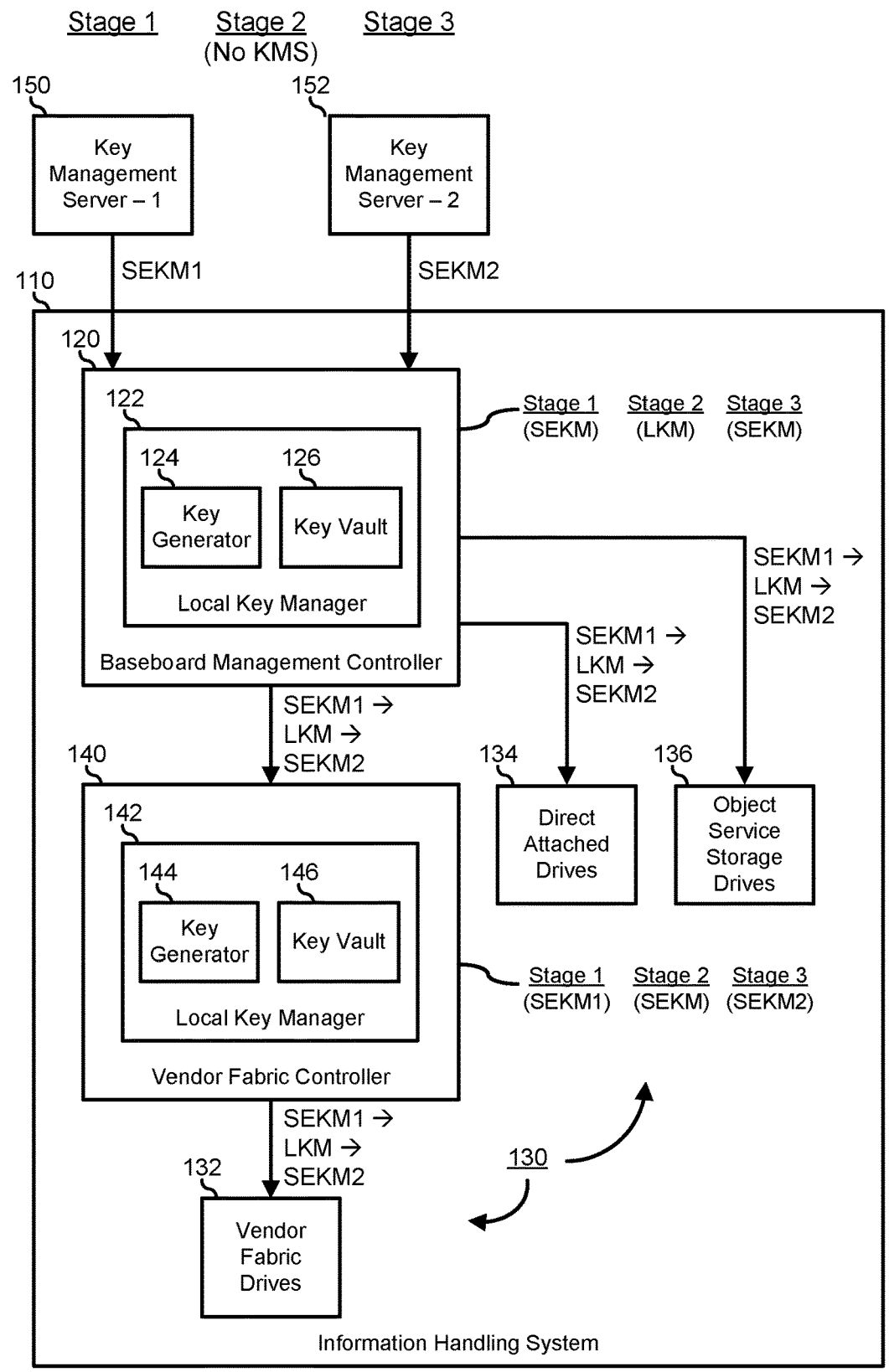
FIG. 4 illustrates the information handling system of FIG. 1 showing another method for encrypting secure data storage devices according to an embodiment of the present disclosure.

The operator of information handling system 110 may periodically decide to change the vendor of KMS 150 to a new vendor, and to employ a new KMS (such as KMS 152 as shown in FIG. 4). Reasons for changing KMS vendors may include high license costs, takeover of the original KMS vendor by another company, the feature mix provided by the original KMS vendor verses the feature mix provided by the new KMS vendor, security concerns with the original KMS vendor, or the like. It has been understood by the inventors of the current disclosure that the migration from one KMS vendor to another KMS vendor is a difficult and time-consuming task. In particular, when an operator of an information handling system halts the operation of the original KMS vendor, the operator is typically required to disable SEKM on the information handling system, resulting in the wiping of user data on the attached secure data storage drives. Thus, to prevent data loss, the operator of the information handling system typically performs a data backup operation or a data migration operation prior to disabling SEKM. However, data backups and migrations necessitate the deployment of redundant hardware to replicate the original configuration.

FIG. 4 illustrates a method for changing the configuration of secure processing environment 100 from an environment that includes a first KMS 150 to an environment that includes a second KMS 152. In a first stage (Stage 1), secure processing environment 100 includes KMS 150, and is configured as described above with reference to FIG. 3. KMS 150 operates to manage first SEKM keys (SEKM1) for information handling system 110. In particular, in Stage 1, BMC 120 and vendor fabric controller 140 are configured with their SEKM functions enabled, and secure data storage drives 130 all receive SEKM1 keys: vendor fabric drives 132 from BMC 120 via vendor fabric controller 140, and direct attach drives 134 and OSS drives 136 directly from the BMC. In a second stage (Stage 2), BMC 120 enables the LKM function and creates new LKM keys for secure data storage drives 130.

Vendor fabric controller 140 continues to operate with the SEKM function enabled, and provides the LKM keys to vendor fabric drives 132, while BMC 120 provides the LKM keys to direct attached drives 134 and OSS drives 136. In a third stage (Stage 3), BMC 120 establishes a new connection with KMS 152 and reenables the SEKM function. KMS 152 then manages second KMS keys (SEKM2) for information handling system 110. In particular, in Stage 3, BMC 120 and vendor fabric controller 140 are configured with their SEKM functions enabled, and secure data storage drives 130 all receive SEKM2 keys: vendor fabric drives 132 from BMC 120 via vendor fabric controller 140, and direct attach drives 134 and OSS drives 136 directly from the BMC.

The utilization of the method illustrated in FIG. 4 permits the seamless migration of KMS systems without the usual disruption of data availability or data loss. Moreover, the migration of KMS systems can be supported via the management of application programming interfaces (APIs) by a management system associated with the information handling system that is being migrated, and does not necessitate customized interactions with the KSM vendors themselves.

Figure 5:
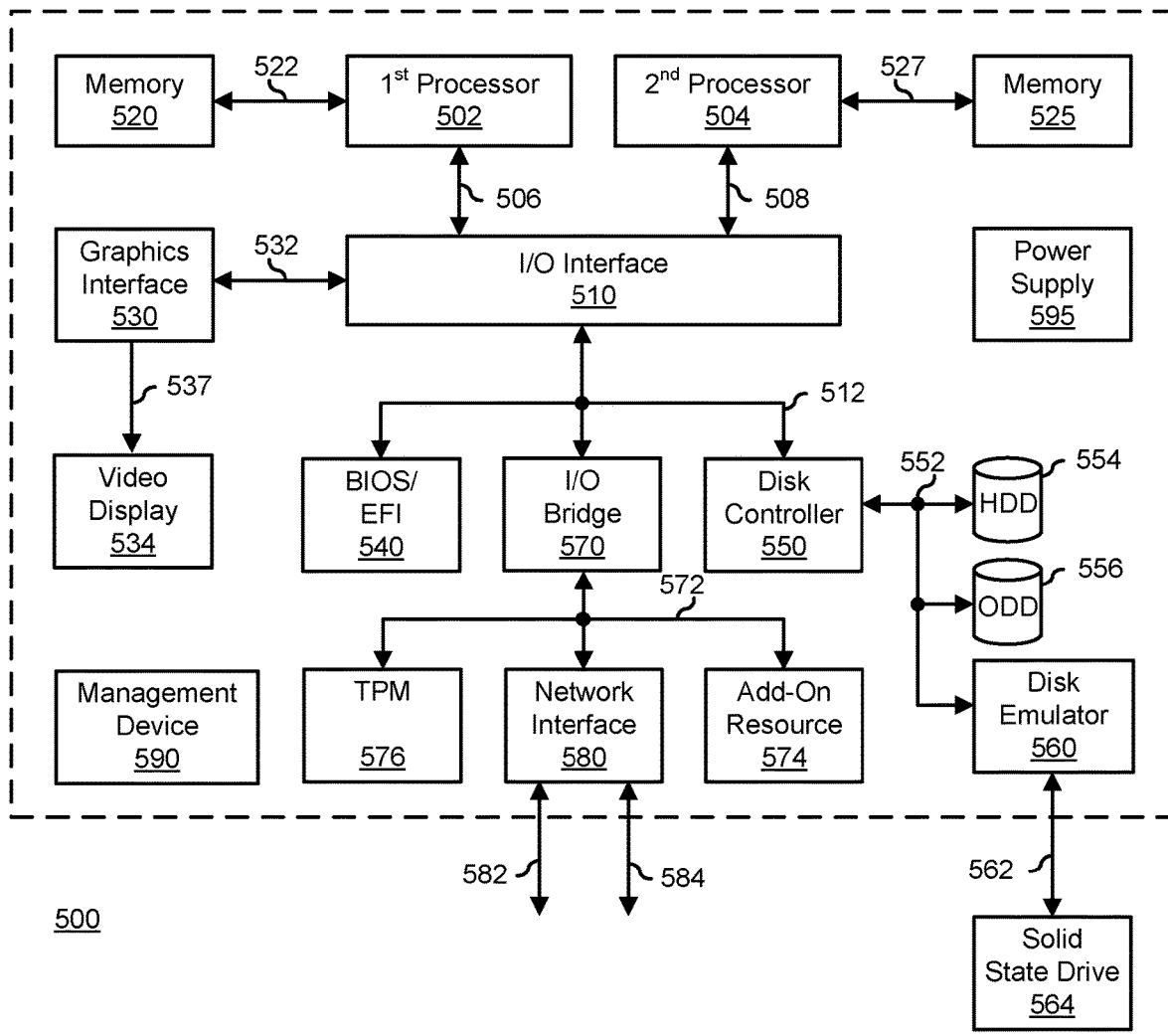
FIG. 5 is a block diagram illustrating a generalized information handling system according to another embodiment of the present disclosure.

FIG. 5 illustrates a generalized embodiment of an information handling system 500 similar to information handling system 500. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 500 can include processing resources for executing machine-executable code, such as a central processing unit (CPU), a programmable logic array (PLA), an embedded device such as a System-on-a-Chip (SoC), or other control logic hardware. Information handling system 500 can also include one or more computer-readable medium for storing machine-executable code, such as software or data. Additional components of information handling system 500 can include one or more storage devices that can store machine-executable code, one or more communications ports for communicating with external devices, and various input and output (I/O) devices, such as a keyboard, a mouse, and a video display. Information handling system 500 can also include one or more buses operable to transmit information between the various hardware components.

Information handling system 500 can include devices or modules that embody one or more of the devices or modules described below, and operates to perform one or more of the methods described below. Information handling system 500 includes a processors 502 and 504, an input/output (I/O) interface 510, memories 520 and 525, a graphics interface 530, a basic input and output system/universal extensible firmware interface (BIOS/UEFI) module 540, a disk controller 550, a hard disk drive (HDD) 554, an optical disk drive (ODD) 556, a disk emulator 560 connected to an external solid state drive (SSD) 562, an I/O bridge 570, one or more add-on resources 574, a trusted platform module (TPM) 576, a network interface 580, a management device 590, and a power supply 595. Processors 502 and 504, I/O interface 510, memory 520, graphics interface 530, BIOS/UEFI module 540, disk controller 550, HDD 554, ODD 556, disk emulator 560, SSD 562, I/O bridge 570, add-on resources 574, TPM 576, and network interface 580 operate together to provide a host environment of information handling system 500 that operates to provide the data processing functionality of the information handling system.

The host environment operates to execute machine-executable code, including platform BIOS/UEFI code, device firmware, operating system code, applications, programs, and the like, to perform the data processing tasks associated with information handling system 500.

In the host environment, processor 502 is connected to I/O interface 510 via processor interface 506, and processor 504 is connected to the I/O interface via processor interface 508. Memory 520 is connected to processor 502 via a memory interface 522. Memory 525 is connected to processor 504 via a memory interface 527. Graphics interface 530 is connected to I/O interface 510 via a graphics interface 532, and provides a video display output 536 to a video display 534. In a particular embodiment, information handling system 500 includes separate memories that are dedicated to each of processors 502 and 504 via separate memory interfaces. An example of memories 520 and 530 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 540, disk controller 550, and I/O bridge 570 are connected to I/O interface 510 via an I/O channel 512. An example of I/O channel 512 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 510 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 540 includes BIOS/UEFI code operable to detect resources within information handling system 500, to provide drivers for the resources, initialize the resources, and access the resources. BIOS/UEFI module 540 includes code that operates to detect resources within information handling system 500, to provide drivers for the resources, to initialize the resources, and to access the resources.

Disk controller 550 includes a disk interface 552 that connects the disk controller to HDD 554, to ODD 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits SSD 564 to be connected to information handling system 500 via an external interface 562. An example of external interface 562 includes a USB interface, an IEEE 1394 (Firewire) interface, a proprietary interface, or a combination thereof. Alternatively, solid-state drive 564 can be disposed within information handling system 500.

I/O bridge 570 includes a peripheral interface 572 that connects the I/O bridge to add-on resource 574, to TPM 576, and to network interface 580. Peripheral interface 572 can be the same type of interface as I/O channel 512, or can be a different type of interface. As such, I/O bridge 570 extends the capacity of I/O channel 512 where peripheral interface 572 and the I/O channel are of the same type, and the I/O bridge translates information from a format suitable to the I/O channel to a format suitable to the peripheral channel 572 where they are of a different type. Add-on resource 574 can include a data storage system, an additional graphics interface, a network interface card (NIC), a sound/video processing card, another add-on resource, or a combination thereof. Add-on resource 574 can be on a main circuit board, on separate circuit board or add-in card disposed within information handling system 500, a device that is external to the information handling system, or a combination thereof.

Network interface 580 represents a NIC disposed within information handling system 500, on a main circuit board of the information handling system, integrated onto another component such as I/O interface 510, in another suitable location, or a combination thereof. Network interface device 580 includes network channels 582 and 584 that provide interfaces to devices that are external to information handling system 500. In a particular embodiment, network channels 582 and 584 are of a different type than peripheral channel 572 and network interface 580 translates information from a format suitable to the peripheral channel to a format suitable to external devices. An example of network channels 582 and 584 includes InfiniBand channels, Fibre Channel channels, Gigabit Ethernet channels, proprietary channel architectures, or a combination thereof. Network channels 582 and 584 can be connected to external network resources (not illustrated). The network resource can include another information handling system, a data storage system, another network, a grid management system, another suitable resource, or a combination thereof.

Management device 590 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 500. In particular, management device 590 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 500, such as system cooling fans and power supplies. Management device 590 can include a network connection to an external management system, and the management device can communicate with the management system to report status information for information handling system 500, to receive BIOS/UEFI or system firmware updates, or to perform other task for managing and controlling the operation of information handling system 500. Management device 590 can operate off of a separate power plane from the components of the host environment so that the management device receives power to manage information handling system 500 where the information handling system is otherwise shut down. An example of management device 590 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 590 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
  a first storage device; and
  a baseboard management controller configured in a first mode to provide external encryption keys for first transactions with the first storage device from external key management services, and in a second mode to generate local encryption keys for the first transactions with the first storage device, wherein:
    at a first time, the baseboard management controller is configured in the first mode to provide first external encryption keys for the first transactions from a first external key management service;
    at a second time subsequent to the first time, the baseboard management controller is configured in the second mode to generate first local encryption keys for the first transactions; and
    at a third time subsequent to the second time, the baseboard management controller is configured in the first mode to provide second external encryption keys for the first transactions from a second external key management service, wherein after the third time, no user data is lost on the first storage device compared with a time prior to the first time.

2. The information handling system of claim 1, wherein the baseboard management controller includes a first key generator.

3. The information handling system of claim 2, wherein, when the baseboard management controller is configured in the second mode, the first key generator generates the local encryption keys.

4. The information handling system of claim 1, further comprising:
  a second storage device; and
  a storage device controller configured in the first mode to provide external encryption keys for second transactions with the second storage device from the external key management services, and in the second mode to generate the local encryption keys for the second transactions with the second storage device.

5. The information handling system of claim 4, wherein:
  at the first time, the storage device controller is configured in the first mode to provide third external encryption keys for the second transactions from the first external key management service via the baseboard management controller;
  at the second time, the storage device controller is configured in the first mode to provide second local encryption keys from the baseboard management controller for the second transactions; and at the third time, the storage device controller is configured in the first mode to provide fourth external encryption keys for the first transactions from the second external key management service via the baseboard management controller, wherein, after the third time, no user data is lost on the second storage device as compared with a time prior to the first time.

6. The information handling system of claim 5, wherein the storage device controller includes a second key generator.

7. The information handling system of claim 6, wherein, when the storage device controller is configured in the second mode, the second key generator generates the local encryption keys.

8. The information handling system of claim 1, wherein the first storage device includes a self-encrypting storage device that operates to encrypt the user data on the first storage device.

9. The information handling system of claim 1, wherein the first storage device includes one of a direct attached data storage device and an object service storage device.

10. The information handling system of claim 1, wherein the external encryption keys are secure external key management encryption keys.

11. A method, comprising:
providing, in an information handling system, a first storage device;
providing, in the information handling system, a baseboard management controller configured in a first mode to provide external encryption keys for first transactions with the first storage device from external key management services, and in a second mode to generate local encryption keys for the first transactions with the first storage device;
configuring, at a first time, the baseboard management controller in the first mode to provide first external encryption keys for the first transactions from a first external key management service;
configuring, at a second time subsequent to the first time, the baseboard management controller in the second mode to generate first local encryption keys for the first transactions; and
configuring, at a third time subsequent to the second time, the baseboard management controller in the first mode to provide second external encryption keys for the first transactions from a second external key management service, wherein after the third time, no user data is lost on the first storage device compared with a time prior to the first time.

12. The method of claim 11, wherein the baseboard management controller includes a first key generator.

13. The method of claim 12, further comprising generating, when the baseboard management controller is configured in the second mode, the local encryption keys by the first key generator.

14. The method of claim 11, further comprising:
providing, in the information handling system, a second storage device; and
providing, in the information handling system, a storage device controller configured in the first mode to provide external encryption keys for second transactions with the second storage device from the external key management services, and in the second mode to generate the local encryption keys for the second transactions with the second storage device.

15. The method of claim 14, further comprising:
configuring, at the first time, the storage device controller in the first mode to provide third external encryption keys for the second transactions from the first external key management service via the baseboard management controller;
configuring, at the second time, the storage device controller in the first mode to provide second local encryption keys from the baseboard management controller for the second transactions; and
configuring, at the third time, the storage device controller in the first mode to provide fourth external encryption keys for the first transactions from the second external key management service via the baseboard management controller, wherein, after the third time, no user data is lost on the second storage device as compared with a time prior to the first time.

16. The method of claim 15, wherein the storage device controller includes a second key generator.

17. The method of claim 16, further comprising generating, when the storage device controller is configured in the second mode, the local encryption keys by the second key generator.

18. The method of claim 11, wherein the first storage device includes a self-encrypting storage device that operates to encrypt the user data on the first storage device.

19. The method of claim 11, wherein the first storage device includes one of a direct attached data storage device and an object service storage device.

20. An information handling system, comprising:
a first external key management service;
a second external key management service;
a storage device; and
a baseboard management controller configured in a first mode to provide external encryption keys for transactions with the first storage device from one of the first and second external key management services, and in a second mode to generate local encryption keys for the transactions with the storage device, wherein:
at a first time, the baseboard management controller is configured in the first mode to provide first external encryption keys for the transactions from the first external key management service;
at a second time subsequent to the first time, the baseboard management controller is configured in the second mode to generate local encryption keys for the transactions; and
at a third time subsequent to the second time, the baseboard management controller is configured in the first mode to provide second external encryption keys for the transactions from the second external key management service, wherein, after the third time, no user data is lost on the first storage device as compared with a time prior to the first time.

* * * * *